United States Patent Office 3,284,482
Patented Nov. 8, 1966

3,284,482
CHLOROBENZYL CARBAZATES
John J. D'Amico, Charleston, W. Va., and Philip C. Hamm, Webster Groves, Mo., assignors to Monsanto Company, a corporation of Delaware
No Drawing. Original application July 30, 1962, Ser. No. 213,158. Divided and this application Oct. 13, 1965, Ser. No. 509,666
6 Claims. (Cl. 260—455)

The instant application is a division of application Serial No. 213,158, filed July 30, 1962.

This invention relates to destroying or controlling undesired vegetation with an ester of a dithiocarbazic acid, to herbicidal compositions containing these esters as an essential active ingredient and to methods of applying such compositions for destroying or controlling vegetation.

The compositions of the present invention contain as their essential active ingredient an ester of a dithiocarbazic acid having the general formula

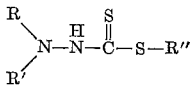

where R is lower alkyl or hydroxy substituted lower alkyl and R' is hydrogen or lower alkyl, both R and R' being hydrogen when R" is a hydrocarbon radical. R" is lower alkyl, benzyl or chlorobenzyl. More particularly, R" may be methyl, ethyl, propyl, isopropyl, butyl, isobutyl, amyl, benzyl, o-chlorobenzyl, p-chlorobenzyl, 3,4-dichlorobenzyl, 2,5 - dichlorobenzyl, 2,6 - dichlorobenzyl, 2,3,6-trichlorobenzyl or 2,4,5,6-tetrachlorobenzyl. Of lower alkyl groups methyl, ethyl and propyl are preferred.

The lower alkyl and benzyl esters are contact herbicides. On the other hand, chlorobenzyl esters are in general innocuous to foliage but are effective pre-emergence herbicides. R and R' are hydrogen when R" is lower alkyl or benzyl and preferably methyl or ethyl when R" is chlorinated benzyl. Chlorobenzyl dithiocarbazates appear to be new compounds. Typical examples comprise p-chlorobenzyl dithiocarbazate, o-chlorobenzyl dithiocarbazate, 2,5-dichlorobenzyl dithiocarbazate, 3,4-dichlorobenzyl dithiocarbazate, 2,6-dichlorobenzyl dithiocarbazate and 2,3,6-trichlorobenzyl dithiocarbazate.

The experimental evidence indicates that chlorobenzyl esters and hydrocarbon esters function as herbicides by entirely different mechanisms. The tables below illustrate characteristic herbicidal activity. The toxicant was emulsified in water and the emulsion applied as a spray. The active components are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided solid carrier, as for example talc, clay, pyrophyllite, silica and fuller's earth. Alternatively, the dry composition may be dispersed in water and applied as a spray. For this purpose presence of a dispersing and wetting aid as illustrated above is beneficial. In general, these adjuvants are organic surface active agents capable of lowering the surface tension of water. Admixture of the ester and surface active agent provides versatile compositions useful for either direct application or for dilution followed by application.

In the foliage tests the spray containing 0.5% concentration of the active ingredient was applied to the foliage of grass and to the foliage of bean plants and finally to the foliage of a mixture of broadleaved plants and the effect recorded. The following phytotoxicity rating key was used:

0—No phytotoxicity
1—Slight phytotoxicity
2—Moderate phytotoxicity
3—Severe phytotoxicity
4—Dead
B—Defoliation TABLE I
[Contact]

| Toxicant | Phytotoxicity Rating | | |
|---|---|---|---|
| | Grass | Bean | Broadleaf |
| Benzyl dithiocarbazate | 2 | 2 | 2 |
| Isopropyl dithiocarbazate | 2 | 1 | 2 |
| Propyl dithiocarbazate | 3 | 4 | 3 |
| Ethyl dithiocarbazate | 3 | *3B | 3 |
| Methyl dithiocarbazate | 3 | 0 | 3 |
| ar,ar,ar-Trichlorobenzyl 3-(2-hydroxyethyl)-dithiocarbazate | 0 | 2 | 1 |

*51-75% defoliation.

It was further found that ethyl dithiocarbazate was still severely toxic to grass, bean plants and broadleaved plants at a solution concentration of 0.2%.

In the pre-emergence tests the spray was applied to the ground of seeded plots before the grass or other plants emerged. The toxicant was applied at the rate of 25 pounds per acre and the phytotoxicity observed.

TABLE II
[Pre-emergence]

| Toxicant | Results Observed |
|---|---|
| ar,ar,ar-Trichlorobenzyl dithiocarbazate. | Severe phytotoxicity to foxtail; moderate phytotoxicity to morning glory, brome grass, field bindweed and pigweed. Tillering or other formative effects observed. |
| ar,ar,ar-Trichlorobenzyl 3,3-dimethyldithiocarbazate. | Severe phytotoxicity to barnyard grass, crab grass and tomato; moderate phytotoxicity to morning glory, pigweed and sorghum. |
| ar,ar,ar-Trichlorobenzyl 3-(2-hydroxyethyl)-dithiocarbazate. | Severe phytotoxicity to morning glory, wild oats, rye grass, sugar beet, radish-mustard, barnyard grass, crab grass, pigweed, wild buckwheat and tomato. |
| 2,3,6-trichlorobenzyl 3,3-diethyldithiocarbazate. | Severe phytotoxicity to morning glory, sugar beet, pigweed, tomato and mixture of broadleaved plants; moderate phytotoxicity to foxtail, crab grass and soybean. Formative action on broadleaved plants. |
| 2,6-dichlorobenzyl 3,3-diethyldithiocarbazate. | Severe phytotoxicity to morning glory, sugar beet, pigweed, tomato and mixture of broadleaved plants; moderate phytotoxicity to foxtail, crab grass and soybean. Formative action on broadleaved plants. |
| 2,5-dichlorobenzyl 3,3-diethyldithiocarbazate. | Moderate phytotoxicity to morning glory and pigweed. Formative action on broadleaved plants. |
| 2,5-dichlorobenzyl 3,3-dimethyldithiocarbazate. | Severe phytotoxicity to crab grass pigweed and tomato; moderate phytotoxicity to rye grass. |
| o-Chlorobenzyl 3-(2-hydroxyethyl)dithiocarbazate. | Severe phytotoxicity to sugar beet and crab grass; moderate phytotoxicity to pigweed and wild buckwheat. |
| p-Chlorobenzyl 3-(2-hydroxyethyl)dithiocarbazate. | Severe phytotoxicity to sugar beet and crab grass; moderate phytotoxicity to wild oats and rye grass. |
| Benzyl dithiocarbazate | Severe phytotoxicity to rye grass, foxtail, barnyard grass and crab grass; moderate phytotoxicity to morning glory, wild oats and brome grass. Tillering or other formative effects noted. |
| Benzyl 3-(2-hydroxyethyl)-dithiocarbazate. | Severe phytotoxicity to sugar beet and wild buckwheat. |
| Propyl dithiocarbazate | Severe phytotoxicity to wild oats, brome grass, foxtail, barnyard grass, crab grass and pigweed; moderate phytotoxicity to morning glory and rye grass. | ar,ar,ar-Trichlorobenzyl dithiocarbazates were derived from trichlorobenzyl chloride prepared by chlorinating toluene in the ring in the presence of a catalyst until the theoretical amount of chlorine has been absorbed, then removing the catalyst and chlorinating in the side chain until the theoretical amount of chlorine calculated for trichlorobenzyl chloride has been absorbed. A suitable procedure is described by Blake, U.S. Patent 2,438,-599, of March 30, 1948. The product is predominately 2,3,6-trichlorobenzyl chloride.

The following examples illustrate in detail the preparation and properties of some of the new compounds but are not to be taken as limitative.

Example 1

A solution comprising 20 grams (0.53 mole) of 85% hydrazine, 85 grams (0.53 mole) of 25% sodium hydroxide and 300 ml. of water was prepared and 40.4 grams (0.53 mole) of carbon bisulfide added dropwise at 10–15° C. over a 20 minute period. External cooling was removed and the stirred reaction mixture held at 25–30° C. for an hour. Then 92 grams (0.40 mole) of trichlorobenzyl chloride (prepared as above described) was added in one portion. The reaction mixture was stirred at 25–30° C. for 24 hours and then extracted with 500 ml. of ethyl ether. The ether solution was washed with water until neutral to litmus, dried over sodium sulfate and the ether removed in vacuo at a maximum temperature of 80–90° C./1–2 mm. The trichlorobenzyl dithiocarbazate, a cream colored semi-solid, was obtained in 83.8% yield. Analysis gave 9.3% nitrogen, the calculated value for $C_8H_7Cl_3N_2S_2$.

Example 2

To a stirred solution containing 6 grams (0.1 mole) of 1,1-dimethyl hydrazine, 10 grams of concentrated ammonium hydroxide and 100 ml. of ethyl alcohol was added dropwise at 5–15° C., 10 grams (0.13 mole) of carbon bisulfide and the reaction mixture stirred at 25–30° C. for one hour. Then 19.5 grams (0.1 mole) of 2,5-dichlorobenzyl chloride was added in one portion. Stirring was continued for 24 hours at 25–30° C. and then 200 ml. of water added. The solution was cooled to 5° C., filtered, washed with water until neutral to litmus and air-dried at 25–30° C. 2,5-dichlorobenzyl 3,3-dimethyldithiocarbazate was obtained in 83.5% yield as a cream solid melting at 117–118° C. after recrystallization from ethyl alcohol. Analysis gave 21.89% sulfur and 23.92% chlorine compared to 21.72% sulfur and 24.02% chlorine calculated for $C_{10}H_{12}Cl_2N_2S_2$.

Example 3

To a stirred solution containing 19.1 grams (0.25 mole) of 2-hydroxyethyl hydrazine, 25 grams of concentrated ammonium hydroxide and 250 ml. of ethyl alcohol was added dropwise at 5–15° C., 19 grams (0.25 mole) of carbon bisulfide and the mixture stirred at 25–30° C. for one hour. After cooling to 5° C., 40.2 grams (0.25 mole) of o-chlorobenzyl chloride was added in one portion and the reaction mixture stirred at 25–30° C. for 24 hours. Thereupon 500 ml. of water and 500 ml. of ethyl ether were added. The ether solution was washed with water until neutral to litmus, dried over sodium sulfate and ether removed in vacuo at a maximum temperature of 80–90° C./1–2 mm. o-Chlorobenzyl 3-(2-hydroxyethyl)dithiocarbazate was obtained in 75.2% yield as an amber oil analyzing 23.93% sulfur compared to 23.17% calculated for $C_{10}H_{13}ClN_2OS_2$.

Example 4 ar,ar,ar-Trichlorobenzyl bromide was substituted for o-chlorobenzyl chloride in Example 3. Trichlorobenzyl 3-(2-hydroxyethyl)dithiocarbazate was obtained as a viscous amber oil in 70.5% yield. Analysis gave 8.3% nitrogen compared to 8.1% calculated for $C_{10}H_{11}Cl_3N_2OS_2$.

Example 5

A solution comprising 8.8 grams (0.1 mole) of diethyl hydrazine, 10 grams of concentrated ammonium hydroxide and 100 ml. of ethyl alcohol was prepared and 7.6 grams (0.1 mole) of carbon bisulfide added dropwise at 5–15° C. After stirring at 25–30° C. for one hour, 30 grams (0.1 mole) of 2,3,6-trichlorobenzyl chloride was added in one portion causing the temperature to rise from 25 to 40° C. The reaction mixture was stirred at 25–30° C. for 24 hours, 300 ml. of water added and the stirred reaction mixture cooled to 0° C. The resulting precipitate was collected by filtration, washed with water until neutral to litmus and air-dried at 25–30° C. 2,3,6-trichlorobenzyl 3,3-diethyldithiocarbazate was obtained in 75.4% yield as a yellow solid melting at 137–138° C. after recrystallization from heptane. Analysis gave 17.91% sulfur and 30.33% chlorine compared to 17.93% sulfur and 29.73% chlorine calculated for $$C_{12}H_{15}Cl_3N_2S_2$$

Example 6

2,5-dichlorobenzyl chloride was substituted for 2,3,6-trichlorobenzyl chloride in Example 5. 2,5-dichlorobenzyl 3,3-diethyldithiocarbazate was obtained in 71.4% yield as a white solid melting at 117–119° C. after recrystallization from heptane.

Example 7

To a stirred solution containing 15 grams (0.25 mole) of dimethyl hydrazine, 25 grams of concentrated ammonium hydroxide and 250 ml. of ethyl alcohol was added dropwise at 0–10° C., 19 grams (0.25 mole) of carbon bisulfide. After stirring at 0–10° C. for 30 minutes, 48.9 grams (0.25 mole) of 3,4-dichlorobenzyl chloride was added dropwise at 0–10° C. and the reaction mixture stirred at 25–30° C. for 24 hours. Thereupon 600 ml. of water were added and stirring continued at 25–30° C. for 30 minutes. The precipitate was collected by filtration, washed with water until neutral and air-dried at 25–30° C. 3,4-dichlorobenzyl 3,3-dimethyldithiocarbazate was obtained in 86% yield as a white solid melting at 113–114° C. after recrystallization from ethyl alcohol. Analysis gave 9.40% nitrogen, 21.59% sulfur and 24.94% chlorine compared to 9.49% nitrogen, 21.72% sulfur and 24.02% chlorine calculated for $C_{10}H_{12}Cl_2N_2S_2$.

It is intended to cover all changes and modifications of the examples of the invention herein chosen for purposes of disclosure which do not constitute departures from the spirit and scope of the invention.

What is claimed is:
1. A compound of the structure

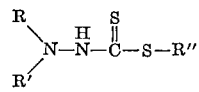

where R is selected from the group consisting of hydrogen, lower alkyl and hydroxy lower alkyl, R' is selected from the group consisting of hydrogen and lower alkyl and R" is chloro-substituted benzyl selected from the group consisting of o-chlorobenzyl, p-chlorobenzyl, 2,5-dichlorobenzyl, 2,6-dichlorobenzyl, 3,4-dichlorobenzyl, 2,3,6-trichlorobenzyl and 2,4,5,6-tetrachlorobenzyl.

2. A compound of the structure

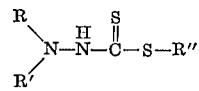

where R and R' are lower alkyl and R" is 2,3,6-trichlorobenzyl.

3. A compound of the structure
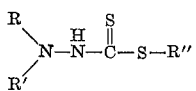
where R is hydroxy lower alkyl, R' is hydrogen and R" is 2,3,6-trichlorobenzyl.
4. 2,3,6-trichlorobenzyl 3,3-diethyldithiocarbazate.
5. 2,3,6-trichlorobenzyl 3-(2-hydroxyethyl)dithiocarbazate.
6. 2,3,6-trichlorobenzyl dithiocarbazate.
No references cited.
CHARLES B. PARKER, *Primary Examiner.*
DALE R. MAHANAND, *Assistant Examiner.*